US009163610B2

(12) United States Patent
Quottrup

(10) Patent No.: US 9,163,610 B2
(45) Date of Patent: Oct. 20, 2015

(54) METHOD OF CONTROLLING A VARIABLE SPEED WIND TURBINE GENERATOR

(75) Inventor: Michael Melholt Quottrup, Aalborg Ø (DK)

(73) Assignee: Vestas Wind Systems A/S, Aarhus N. (DK)

( * ) Notice: Subject to any disclaimer, the term of this patent is extended or adjusted under 35 U.S.C. 154(b) by 504 days.

(21) Appl. No.: 13/003,935

(22) PCT Filed: Jul. 7, 2009

(86) PCT No.: PCT/IB2009/052947
§ 371 (c)(1),
(2), (4) Date: Apr. 8, 2011

(87) PCT Pub. No.: WO2010/010476
PCT Pub. Date: Jan. 28, 2010

(65) Prior Publication Data
US 2011/0175352 A1 Jul. 21, 2011

Related U.S. Application Data

(60) Provisional application No. 61/135,710, filed on Jul. 22, 2008.

(30) Foreign Application Priority Data

Jul. 22, 2008 (DK) .................................. 2008 01033

(51) Int. Cl.
F03D 7/04 (2006.01)
F03D 7/02 (2006.01)
F03D 9/00 (2006.01)

(52) U.S. Cl.
CPC ............ *F03D 7/0284* (2013.01); *F03D 7/0276* (2013.01); *F03D 7/042* (2013.01);

(Continued)

(58) Field of Classification Search
CPC ..... F03D 7/0276; F03D 7/0284; F03D 7/042; F03D 9/003; F05B 2270/101; F05B 2270/337; Y02E 10/723; Y02E 10/725
See application file for complete search history.

(56) References Cited

U.S. PATENT DOCUMENTS 4,700,081 A * 10/1987 Kos et al. ........................ 290/44
5,729,118 A * 3/1998 Yanagisawa et al. ........... 322/29

(Continued)

FOREIGN PATENT DOCUMENTS

EP 0688095 A2 12/1995
EP 1914420 A1 4/2008

OTHER PUBLICATIONS

Feltes et al., "Variable Frequency Operation of DFIG based Wind Farms connected to the Grid through VSC-HVDC Link" IEEE Power Engineering Society General Meeting, 2007, pp. 1-7.

(Continued)

*Primary Examiner* — Tulsidas C Patel
*Assistant Examiner* — S. Mikailoff
(74) *Attorney, Agent, or Firm* — Patterson & Sheridan, LLP

(57) ABSTRACT

Methods of controlling a variable speed wind turbine generator connected to a power grid. The method may include measuring the frequency, f, of the power grid, controlling the speed of the generator for optimizing the power delivered to the power grid, and setting limits for the generator speed. The setting of the limits for the generator speed is performed in dependency of the measured frequency of the power grid. This provides a dynamical set of limits providing improved possibilities of optimizing the power production.

17 Claims, 4 Drawing Sheets

(52) U.S. Cl.
CPC .......... *F03D 9/003* (2013.01); *F05B 2270/101* (2013.01); *F05B 2270/337* (2013.01); *Y02E 10/723* (2013.01); *Y02E 10/725* (2013.01)

(56) References Cited

U.S. PATENT DOCUMENTS

| | | | |
|---|---|---|---|
| 8,946,916 B2* | 2/2015 | Tarnowski | 290/44 |
| 2003/0155773 A1 | 8/2003 | Wobben | |
| 2004/0119292 A1* | 6/2004 | Datta et al. | 290/44 |
| 2007/0069522 A1* | 3/2007 | Barton et al. | 290/44 |
| 2007/0267873 A1* | 11/2007 | Teichmann | 290/44 |
| 2008/0093857 A1* | 4/2008 | Stiesdal | 290/44 |
| 2009/0261589 A1* | 10/2009 | Oohara et al. | 290/44 |
| 2009/0322086 A1* | 12/2009 | Letas | 290/44 |
| 2013/0187385 A1* | 7/2013 | Wakasa et al. | 290/44 |

OTHER PUBLICATIONS

Steven W. Saylors, "Meeting North American Grid Codes" Vestas Americas—North East Region Systems Operators Wind Integration Seminar, Feb. 12, 2008, p. 5-6.

Park et al., "Control of Active Power in a Doubly-fed Induction Generator Taking into Account the Rotor Side Apparent Power", IEEE Power Electronics Specialists Conference, Jun. 2004, pp. 2060-2064.

European Patent Office, International Search Report and Written Opinion issued in related International Application No. PCT/IB2009/052947 dated Dec. 30, 2009.

Denmark Patent Office, Search Report issued in related Denmark application No. PA 2008 01033 dated Apr. 2, 2009.

* cited by examiner

METHOD OF CONTROLLING A VARIABLE SPEED WIND TURBINE GENERATOR

TECHNICAL FIELD

The present invention relates to variable speed wind turbine generators connected to the power grid and more specifically to the control of such wind turbine generators when the power grid frequency deviates from the nominal frequency.

BACKGROUND ART

Typically, such wind turbines have been controlled in generator speed to deliver maximum power to the power grid and certain fixed maximum and minimum speed limits have been imposed in order to limit the load on the turbine components, e.g., the converter, drive train, generator, etc.

U.S. Pat. No. 5,729,118 discloses a variable speed induction generator-motor with controllable excitation frequency, in which the slip frequency is kept constant during variations of the power grid frequency.

DISCLOSURE OF THE INVENTION

Based on this prior art it is the object of the present invention to provide a method of controlling a variable speed wind turbine generator with which it is possible to optimize the power generation by optimizing the generator speed. Preferably, the generator speed is controlled based on the wind speed, and the control is performed by pitch control of the wind turbine blades. Furthermore, it is desirable to be able to set dynamic limits for the generator speed, said dynamic limits taking into account the possible variations in the power grid frequency, even at relatively large variations thereof. This object is achieved by a method of said kind, which according to the present invention also comprises the features set forth in the characterizing part of claim 1. In this configuration, the limits for the speed of the generator are dynamically adapted to the frequency of the power grid, whereby the power delivery from the generator may be optimized as it is subjected to appropriate limits during periods of varying power grid frequencies. Preferred embodiments of the method, the advantages of which will be evident from the following detailed description of the invention, are revealed in the subordinate claims.

BRIEF DESCRIPTION OF THE DRAWINGS

In the following detailed part of the present description, the invention will be explained in more detail with reference to exemplary embodiments of a method according to the invention with reference to the drawings.

DESCRIPTION OF THE PREFERRED EMBODIMENTS

Figure 3:
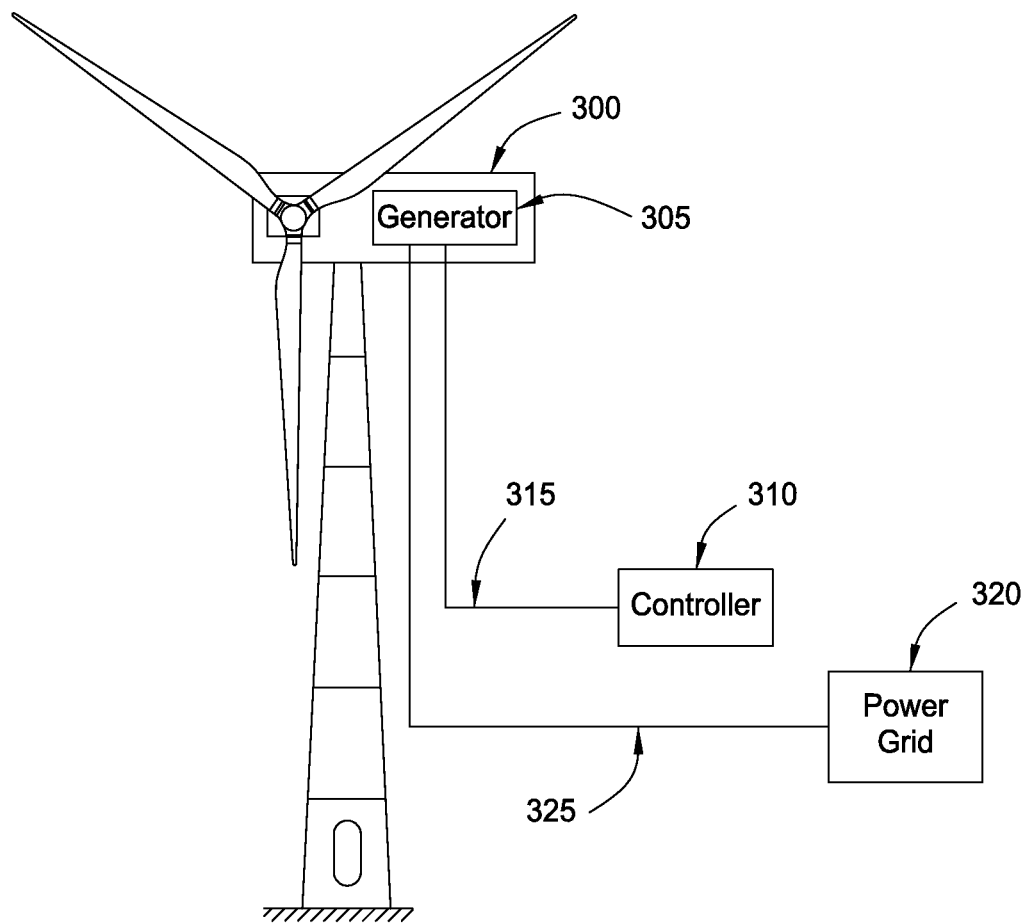
FIG. 3 is a schematic view of a variable speed wind turbine coupled to a controller and a power grid, according to embodiments of the present invention.

FIG. 3 depicts a variable speed wind turbine 300 comprising a generator 305 and coupled to a power grid 320 via cables or busbars 325. The variable speed wind turbine 300 is also coupled to a controller 310 via connection 315.

Figure 1:
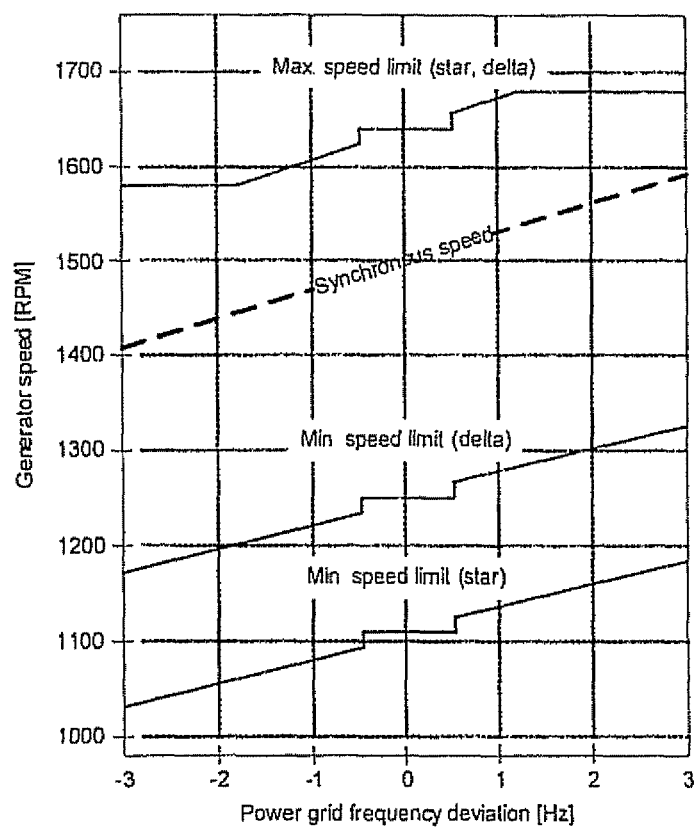
FIG. 1 is a diagram of the generator speed limits as a function of the deviation in grid frequency in accordance with one preferred embodiment of the method, the deviation in grid frequency being defined to be the measured grid frequency minus the nominal grid frequency.

As is indicated above, the aim of the present invention is to perform a dynamic correction or adjustment of the upper and lower limits for the generator speed in accordance with deviations in the grid frequency. As indicated in the accompanying figures, such dynamic correction of the maximum and minimum speed for the generator can be performed in different intervals. As shown in FIG. 1, the maximum and minimum speed for the generator is set to fixed values, as long as the deviation from the nominal frequency is less than ±1%, corresponding to the interval 49.5 Hz to 50.5 Hz or 59.4 Hz to 60.6 Hz, respectively, for a 50 Hz and 60 Hz nominal grid frequency, respectively. The purpose of this deadband is to avoid corrections as long as the frequency deviations are insignificant and only perform corrections when the frequency deviations are extreme.

For a 50 Hz generator, typical values for the fixed values of the upper and lower limits may be synchronous speed, e.g. 1500 rpm, plus 12%, and the synchronous speed minus 16.7%, respectively. As shown in FIG. 1, the upper speed limit may be furthermore fixedly limited to 1680 rpm, in order to avoid overspeeding. This can be seen as the horizontal part of the upper limit above approximately 1.2 Hz deviation in grid frequency. Furthermore, as shown in FIG. 1, this upper limit may be expanded below a deviation of approximately −1.8 Hz to a generator speed of 1580 rpm. This fixation of the upper limit at approximately 1580 rpm is introduced in order to prevent the generator torque from increasing significantly at a negative deviation in the grid frequency.

For the lower speed limit, FIG. 1 indicates a constant percentage deviation from the synchronous speed calculated based on the deviating grid frequency. Thus, the lower limit, apart from the interval from 49.5 to 50.5 Hz, is limited to the calculated synchronous speed, based on the deviating grid frequency, minus 16.7%.

In certain types of wind turbines, it is preferred to operate the speed of the generator below synchronous speed, i.e. operating sub-synchronously, at all times. The reason for this may be different, e.g. due to the fact that the possible back-to-back converter connected between the rotor windings and the grid, can be constructed to only deliver power in one direction.

Figure 2:
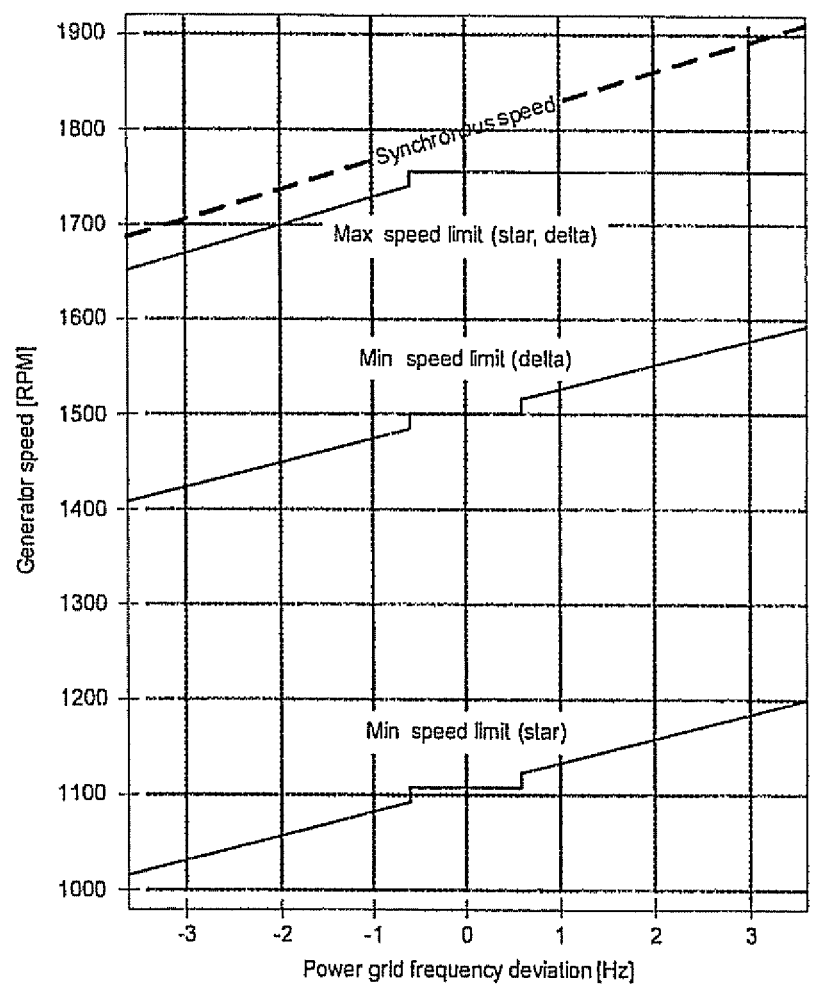
FIG. 2 is a corresponding diagram of the generator speed limit as a function of the deviation in grid frequency in accordance with another preferred embodiment of the present invention.

In this situation, the upper and lower speed limits for the generator may be as shown in FIG. 2, where the rotational speed of the generator is kept below the calculated synchronous speed minus 2.3% for frequency deviations between −3.6 Hz and −0.6 Hz, and is kept below synchronous speed minus 2.3% for deviations in grid frequency between −0.6 Hz and +3.6 Hz. The lower limit for the generator speed is, as also shown in FIG. 1 above, the calculated synchronous speed minus 16.7% for the intervals of grid frequency deviation between −6% and −1% and between +1% and +6%, and the nominal synchronous speed minus 16.7% at grid frequency deviations between −1% and +1%.

The stator of the generator may be connected to the power grid in one of two different configurations, i.e., star and delta configurations. Different restrictions may apply to both speed and power in these two configurations, and examples of this can be seen in FIGS. 1 and 2, where, as is typically found, the maximum speed limit will be identical for star and delta configurations, whereas the minimum speed limit will be lower for delta configuration than for star configuration, as indicated.

Figure 4:
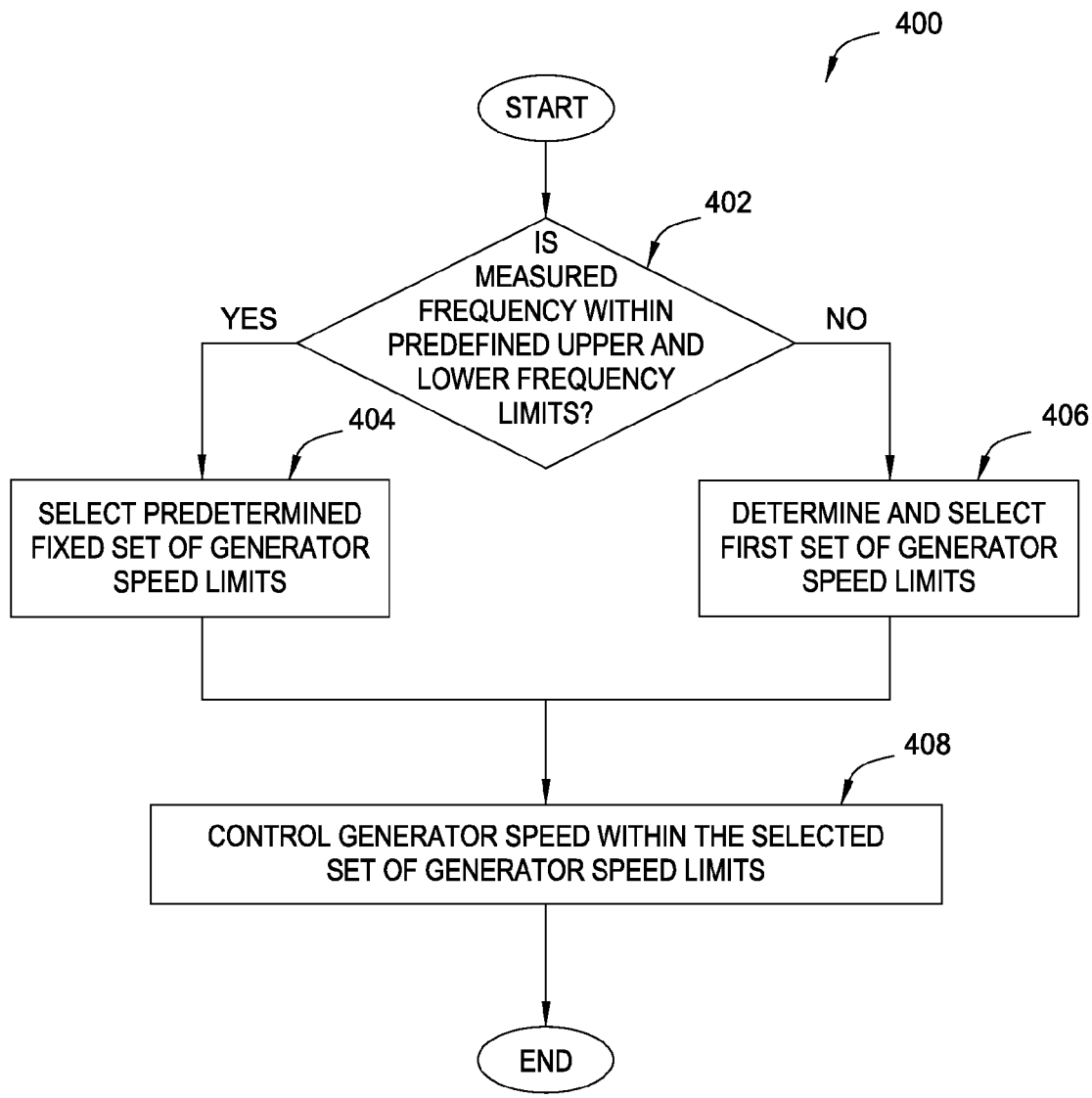
FIG. 4 is a flow diagram illustrating a method for dynamic control of a variable speed wind turbine generator to achieve a desired power production during deviations in power grid frequency, according to embodiments of the present invention.

FIG. 4 illustrates a method 400 for dynamic control of a variable speed wind turbine generator to achieve a desired power production during deviations in power grid frequency, according to embodiments of the present invention. The method 400 begins at block 402, where the controller 310 determines whether the measured frequency is within predefined upper and lower frequency limits. As described above, these limits may be an interval surrounding the nominal frequency, e.g., the nominal frequency ±1%. If the measured frequency is within the predefined limits, the method 400 proceeds to block 404, where the controller 310 selects a predetermined fixed set of generator speed limits, comprising a fixed upper speed limit and a fixed lower speed limit. However, if the measured frequency falls outside the predefined limits, method 400 proceeds to block 406, where the controller 310 determines and selects a first set of generator speed limits. Controller 310 may determine the first set of generator speed limits by adjusting from the fixed upper and lower speed limits by the same percentage that the measured frequency deviates from the nominal frequency. Following either of block 404 and 406, at block 408 the controller 310 controls generator speed within the selected set of generator speed limits to achieve the desired power production during deviations in power grid frequency, and the method 400 ends.

What is claimed is:

1. A method of dynamic control of a variable speed wind turbine generator for desired power production during deviations in power grid frequency, wherein the generator is connected to a power grid and is coupled to a controller configured to control a speed of the generator, the method comprising:
   determining, based on a measured grid frequency, a grid frequency deviation;
   selecting, via the controller and based on the grid frequency deviation, a set of generator speed limits from:
      a first set of generator speed limits comprising a first upper speed limit and a first lower speed limit when the grid frequency deviation is within a predefined frequency deviation interval, wherein each of the first upper speed limit and the first lower speed limit have a respective fixed value, and
      a second set of generator speed limits comprising a second upper speed limit and a second lower speed limit when the grid frequency deviation is outside the predefined frequency deviation interval, wherein, when the grid frequency deviation is outside the predefined frequency deviation interval but less than a predefined upper threshold value, the second upper speed limit varies as a function of a synchronous speed of the generator plus a first fixed percentage of the synchronous speed, and the second upper speed limit is further limited by a fixed maximum generator speed when the grid frequency deviation is greater than the upper threshold value, and wherein the second lower speed limit comprises the synchronous speed of the generator minus a second fixed percentage of the synchronous speed; and
   controlling, via the controller, the speed of the generator within the selected set of generator speed limits.

2. The method of claim 1, wherein the frequency deviation interval is defined by a predetermined amount of deviation from a nominal grid frequency.

3. The method of claim 2, wherein the predetermined amount of deviation is ±1% of the nominal grid frequency.

4. The method of claim 1, wherein the first set of generator speed limits provides an interval surrounding the synchronous speed of the generator, the interval corresponding to a nominal grid frequency interval.

5. The method of claim 1, further comprising disconnecting the generator, via the controller, from the power grid when the grid frequency deviation exceeds a predetermined limit.

6. The method of claim 5, wherein the predetermined limit is provided as a percentage deviation from a nominal grid frequency.

7. The method of claim 1, further comprising disconnecting the generator, via the controller, from the power grid when the measured grid frequency deviates more than a predetermined percentage from a nominal grid frequency.

8. The method of claim 7, wherein the predetermined percentage is ±6%.

9. A method of dynamic control of a variable speed wind turbine generator for desired power production during deviations in power grid frequency, wherein the generator is connected to a power grid and is coupled to a controller configured to control a speed of the generator, the method comprising:
   determining, based on a measured grid frequency, a grid frequency deviation;
   selecting, via the controller and based on the grid frequency deviation, a set of generator speed limits from:
      a first set of generator speed limits comprising a first upper speed limit and a first lower speed limit when the grid frequency deviation is within a predefined frequency deviation interval, wherein each of the first upper speed limit and the first lower speed limit have a respective fixed value and
      a second set of generator speed limits comprising a second upper speed limit and a second lower speed limit when the grid frequency deviation is outside the predefined frequency deviation interval, wherein, when the grid frequency deviation is outside the predefined frequency deviation interval but less than a predefined upper threshold value, the second upper speed limit varies as a function of a synchronous speed of the generator plus a first fixed percentage of the synchronous speed, and the second upper speed limit is further limited by a fixed maximum generator speed when the grid frequency deviation is greater than the upper threshold value, and wherein the second lower speed limit comprises the synchronous speed of the generator minus a second fixed percentage of the synchronous speed;
   controlling, via the controller, the speed of the generator within the selected set of generator speed limits; and
   upon determining that the measured grid frequency deviates more than a predetermined percentage from a nominal grid frequency, disconnecting the generator from the power grid,
   wherein the first set of generator speed limits provides an interval surrounding the synchronous speed of the generator, the interval corresponding to a nominal grid frequency interval.

10. A system for dynamic control of a speed of a variable speed wind turbine generator to maximize power production during deviations in power grid frequency, the system comprising:

the variable speed wind turbine generator connected to a power grid; and a controller, coupled to the variable speed wind turbine generator, and configured to:

determine, based on a measured grid frequency, a grid frequency deviation;

select, based on the grid frequency deviation, a set of generator speed limits from:

a first set of generator speed limits comprising a first upper speed limit and a first lower speed limit when the grid frequency deviation is within a predefined frequency deviation interval, wherein each of the first upper speed limit and the first lower speed limit have a respective fixed value, and a second set of generator speed limits comprising a second upper speed limit and a second lower speed limit when the grid frequency deviation is outside the predefined frequency deviation interval, wherein, when the grid frequency deviation is outside the predefined frequency deviation interval but less than a predefined upper threshold value, the second upper speed limit varies as a function of a synchronous speed of the generator plus a first fixed percentage of the synchronous speed, and the second upper speed limit is further limited by a fixed maximum generator speed when the grid frequency deviation is greater than the upper threshold value, and wherein the second lower speed limit comprises the synchronous speed of the generator minus a second fixed percentage of the synchronous speed; and control the speed of the generator within the selected set of generator speed limits.

11. The system of claim 10, wherein the frequency deviation interval is defined by a predetermined amount of deviation from a nominal grid frequency.

12. The system of claim 11, wherein the predetermined amount of deviation is ±1% of the nominal grid frequency.

13. The system of claim 10, wherein the first set of generator speed limits provides an interval surrounding the synchronous speed of the generator, the interval corresponding to a nominal grid frequency interval.

14. The system of claim 10, wherein the controller is further configured to disconnect the generator from the power grid when the grid frequency deviation exceeds a predetermined limit.

15. The system of claim 14, wherein the predetermined limit is provided as a percentage deviation from a nominal grid frequency.

16. The system of claim 10, wherein the controller is further configured to disconnect the generator from the power grid when the measured grid frequency deviates more than a predetermined percentage from a nominal grid frequency.

17. The system of claim 16, wherein the predetermined percentage is ±6%.

* * * * *